United States Patent
England et al.

(10) Patent No.: US 7,097,097 B1
(45) Date of Patent: Aug. 29, 2006

(54) CHECK BOOK UNIT FOR USE WITH DEBIT CARDS

(76) Inventors: Barry Andrew England, 8240 Edwards Ave., Leeds, AL (US) 35094; Georgia Lynette England, 8240 Edwards Ave., Leeds, AL (US) 35094

( * ) Notice: Subject to any disclaimer, the term of this patent is extended or adjusted under 35 U.S.C. 154(b) by 92 days.

(21) Appl. No.: 10/974,693

(22) Filed: Oct. 28, 2004

(51) Int. Cl.
*G06F 19/00* (2006.01)

(52) U.S. Cl. .................. 235/379; 235/441; 235/493; 705/33

(58) Field of Classification Search ............ 235/441; 705/33
See application file for complete search history.

(56) References Cited

U.S. PATENT DOCUMENTS

| | | | |
|---|---|---|---|
| 4,304,809 A | 12/1981 | Moraw et al. | |
| 4,422,252 A | 12/1983 | Wicks | |
| 4,724,527 A * | 2/1988 | Nishimura et al. | 708/106 |
| 4,737,911 A | 4/1988 | Freeman, Jr. | |
| 5,012,077 A | 4/1991 | Takano | |
| 5,233,547 A * | 8/1993 | Kapp et al. | 708/106 |
| D340,472 S | 10/1993 | Chriest et al. | |
| 5,299,295 A * | 3/1994 | Kim et al. | 358/1.12 |
| 5,531,482 A | 7/1996 | Blank | |
| 2003/0083967 A1 * | 5/2003 | Fleming | 705/33 |

* cited by examiner

Primary Examiner—Seung H Lee
(74) Attorney, Agent, or Firm—Donald R. Schoonover

(57) ABSTRACT

A check book unit has a card reader and a PDA-type system. Check transactions are recorded in the unit using the PDA-type unit and a computer keeps track of the balance and other data associated with the check transaction. A card reader is also included and uses one of the magnetic stripes on a debit card. After a debit card is used, the details of the transaction are recorded onto the magnetic stripe. When the debit card is swiped through the card reader on the unit, the details of the transaction are transferred into the computer memory associated with the unit. The computer then records the details of the transaction from the data entered on the debit card and performs the arithmetic required to balance the user's check book balance.

3 Claims, 1 Drawing Sheet

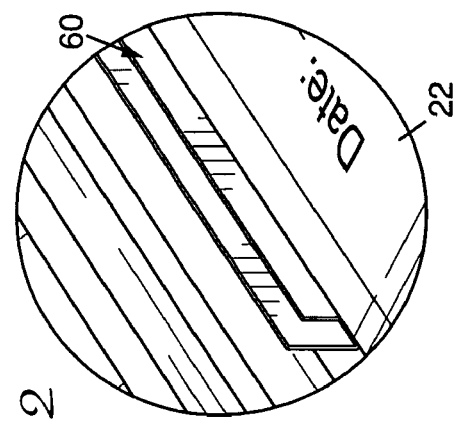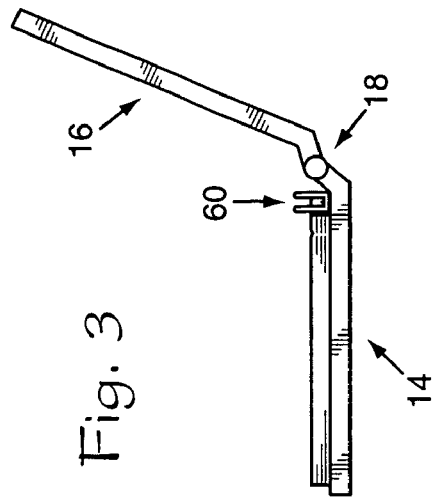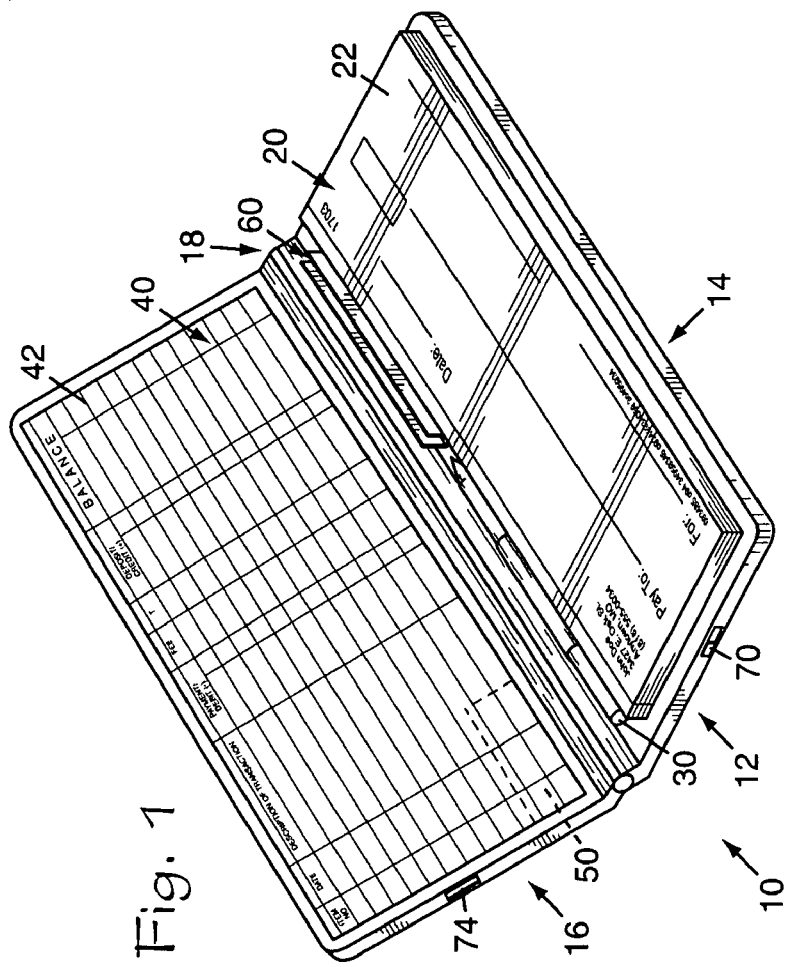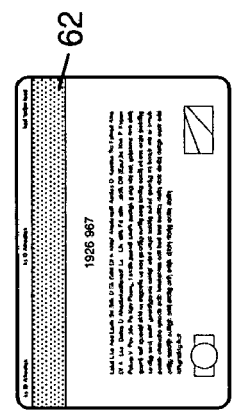

CHECK BOOK UNIT FOR USE WITH DEBIT CARDS

BACKGROUND OF THE INVENTION

1. Field of the Invention

The present invention relates to the general art of data processing, and to the particular field of financial data processing.

2. Description of the Related Art

Many people use checks, credit cards, and debit cards to pay bills, and the like. All of the transactions involving these media require the user to record some data regarding the transaction whereby they can be sure they have sufficient funds in their accounts to cover the transactions. With checks, a user records data associated with the check in a record portion of the check book. With a debit card, the same process should be followed.

However, many people forget to record a transaction in their check book and therefore are at risk of having an incorrect balance shown in their check book. Furthermore, some people are prone to making errors in the arithmetic associated with such transactions, especially if the transaction occurs in distracting conditions. This can lead to errors which include an error causing an overdrawn account.

Therefore, there is a need for a check book unit which makes record keeping easy, efficient and accurate.

The art does contain certain examples of check books that include computers whereby the arithmetic associated with check writing transactions can be carried out by the computer; however, the inventor is not aware of any such check book unit that can work with a debit card as well. A debit card transaction should be handled in a manner that is similar to the check writing transaction.

Therefore, there is a need for a check book unit which makes record keeping easy, efficient and accurate and which is amenable for use with debit cards.

PRINCIPAL OBJECTS OF THE INVENTION

It is a main object of the present invention to provide a check book unit which makes record keeping easy, efficient and accurate.

It is another object of the present invention to provide a check book unit which makes record keeping easy, efficient and accurate and which is amenable for use with debit cards.

SUMMARY OF THE INVENTION

These, and other, objects are achieved by a check book unit that includes a PDA-type portion as well as a debit card reader unit. The unit further includes a check book portion containing checks and the like. A user uses the check book portion in a known manner, then records data from a transaction in the PDA-type portion in the manner of a PDA. A computer memory in the unit carries out the arithmetic associated with the transaction and records the data in the manner of a check book record portion. If the user uses a debit card after the transaction has been completed by a merchant or the like, the data associated with that transaction is recorded on one of the magnetic strips of the debit card by the merchant as the transaction is completed by the merchant. The user then swipes the used debit card through the card reader of the unit of the present invention and that data is read from the magnetic strip and read into the computer system of the unit of the present invention. This data is then manipulated by the computer of the unit to update the user's balance. The data is stored on the magnetic strip until the card is moved through the reader on the unit. As soon as the data is transferred from the magnetic strip to the computer in the unit, the data is erased from the magnetic strip. The magnetic strips on the debit card are capable of storing data from several transactions, so the user can wait for an appropriate time to transfer the data from the debit card into the memory of the unit of the present invention.

Using the unit embodying the present invention will permit a user to keep accurate records of both checks and debit card transactions. The records are easily transferred and can be maintained intact until transfer is made. Thus, accurate records and an accurate record of a user's account and balance are maintained by the unit embodying the present invention.

BRIEF DESCRIPTION OF THE DRAWING FIGURES

FIG. 1 is a perspective view of a check book unit embodying the present invention.

FIG. 2 is a perspective view of a card reader portion of the check book unit shown in FIG. 1.

FIG. 3 is a side elevational view of the check book unit shown in FIG. 1.

FIG. 4 is a back view of a debit card that can be read by the check book unit embodying the present invention.

DETAILED DESCRIPTION OF THE PREFERRED EMBODIMENT

Other objects, features and advantages of the invention will become apparent from a consideration of the following detailed description and the accompanying drawings.

Referring to the Figures, it can be understood that the present invention is embodied in a check book unit 10 which is used in the manner which achieves the above-stated objectives.

Check book unit 10 comprises a container 12, such as a check book cover or the like, which has a first portion 14, a second portion 16, and a hinge portion 18 which hingeably connects first portion 14 to second portion 16. Container 12 can be opened as shown in FIG. 1 or closed with second portion 16 overlying first portion 14 as is the case with the usual check book.

A check book container 20 is mounted on first portion 14 and contains the usual checks, such as check 22, bank receipts, and the like. The checks and bank receipts are used in the well known manner.

A stylus 30 is removably mounted on first portion 14 and is used in the well known manner.

A writing screen 40 is mounted on second portion 16 and includes a grid 42. Writing screen 40 is adapted to be written on using stylus 30 in the manner of a PDA unit. Data from a check transaction, such as name or payee, date, amount, memo, check number, and the like are written on screen 40 using stylus 30.

A microprocessor 50 is mounted in second portion 16 and is electrically connected to writing screen 40 to register data written on writing screen 40 using stylus 30. Microprocessor 50 is similar to those used in the personal data assistant (PDA) art. The particular form of the microprocessor 50 is not a part of the present invention and thus will not be described herein in detail.

Software is stored in microprocessor 50 to store and manipulate data entered therein via screen 40. Such software is known to those skilled in the personal data assistant (PDA) art. The particular form of the software is not a part of the present invention and thus will not be described herein in detail.

A magnetic strip reader 60 is mounted on first portion 14 and is electrically connected to microprocessor 50 to transfer data from a magnetic strip, such as magnetic strip 62, on a card, such as debit card 64 shown in FIG. 4, to microprocessor 50 when card 64 is moved through magnetic strip reader 60. Most debit cards have one or more magnetic strips thereon. One of these magnetic strips is used for strip 62. If a card does not already have such strips, a strip would be placed on the card.

An on/off button 70 is electrically connected to the various electronic components, including a power source, such as a battery or the like stored in second portion 16. Unit 10 is activated by turning on/off button 70 to "on".

Data stored on magnetic strip 62 is transferred to microprocessor 50 and is manipulated thereby to enter data that is important to check book record keeping, such as amount of transaction, payee, date, memo and the like. This data is handled in a manner similar to the data entered via screen 40 using stylus 30. The data is then manipulated in microprocessor 50 to update the user's balance and the like.

Data is entered on magnetic strip 62 by a merchant or other payee to whom the debit card 64 has been given for payment. This data is entered on strip 62 when the debit card 64 is moved through the card reader 60 of the merchant or other payee during completion of the transaction. Software and hardware used for this purpose are not discussed here as the exact details of such software and hardware are not part of this invention. In addition to the above-mentioned data, the name of the merchant, the time of purchase, the location of the store, and the like, can also be recorded on the magnetic strip 62 by the machine used by the merchant to complete the transaction.

Data stored on magnetic strip 62 remains on the strip 62 until it has been read by reader 60 and entered into microprocessor 50. After the data has been stored in microprocessor 50, the microprocessor 50 signals reader 60 to erase the data that has been stored from strip 62. The strip 62 is then free to have further data entered thereon. Strip 62 can store data from a plurality of transactions. Thus, the debit card 64 can be used several times before magnetic strip 62 is filled. The user can then swipe the debit card 64 through reader 60 at a time and location that is convenient to him or to her and all of the transactions will be recorded in microprocessor 50 and the bank balance and data updated to reflect each of the transactions. If the magnetic strip 62 is full and no further data can be entered, the card device being used by the payee for the transaction will have software to indicate such "magnetic strip full" status. The transaction can be held in abeyance until the user moves the card 64 through card reader 60 to transfer the data stored on the magnetic strip 62 to microprocessor 50 and to a clear space on the magnetic strip 62.

Appropriate security software can be included with unit 10 whereby a user code must be input before unit 10 can be activated if desired. Furthermore, microprocessor 50 can include programs associated with PDAs such as calenders, appointment schedulers, and the like as will occur to those skilled in the art based on the teaching of this disclosure. Data from microprocessor 50 can be downloaded to another computer or the like if suitable. Suitable ports, such as data port 74, can be used to download or upload data.

It is understood that while certain forms of the present invention have been illustrated and described herein, it is not to be limited to the specific forms or arrangements of parts described and shown.

What is claimed as new and desired by Letters Patent of the United States is:

1. A check book unit comprising:
    (a) a container having a first portion, a second portion and a hinge portion connecting the first portion to the second portion;
    (b) a check book container mounted on the first portion;
    (c) a stylus removably mounted on the first portion;
    (d) a writing screen mounted on the second portion, said writing screen being adapted to be written on using said stylus;
    (e) a microprocessor mounted in the second portion and connected to said writing screen to register data written on said writing screen using said stylus; and
    (f) a magnetic strip reader mounted on the first portion and electrically connected to said microprocessor to transfer data from a magnetic strip on a card to said microprocessor when the card is moved through said magnetic strip reader.

2. The check book unit as described in claim 1 further including a grid on said writing screen.

3. The check book unit as described in claim 1 further including a data port on the second portion of said container.

* * * * *